US United States Patent Office 3,447,618
Patented June 3, 1969

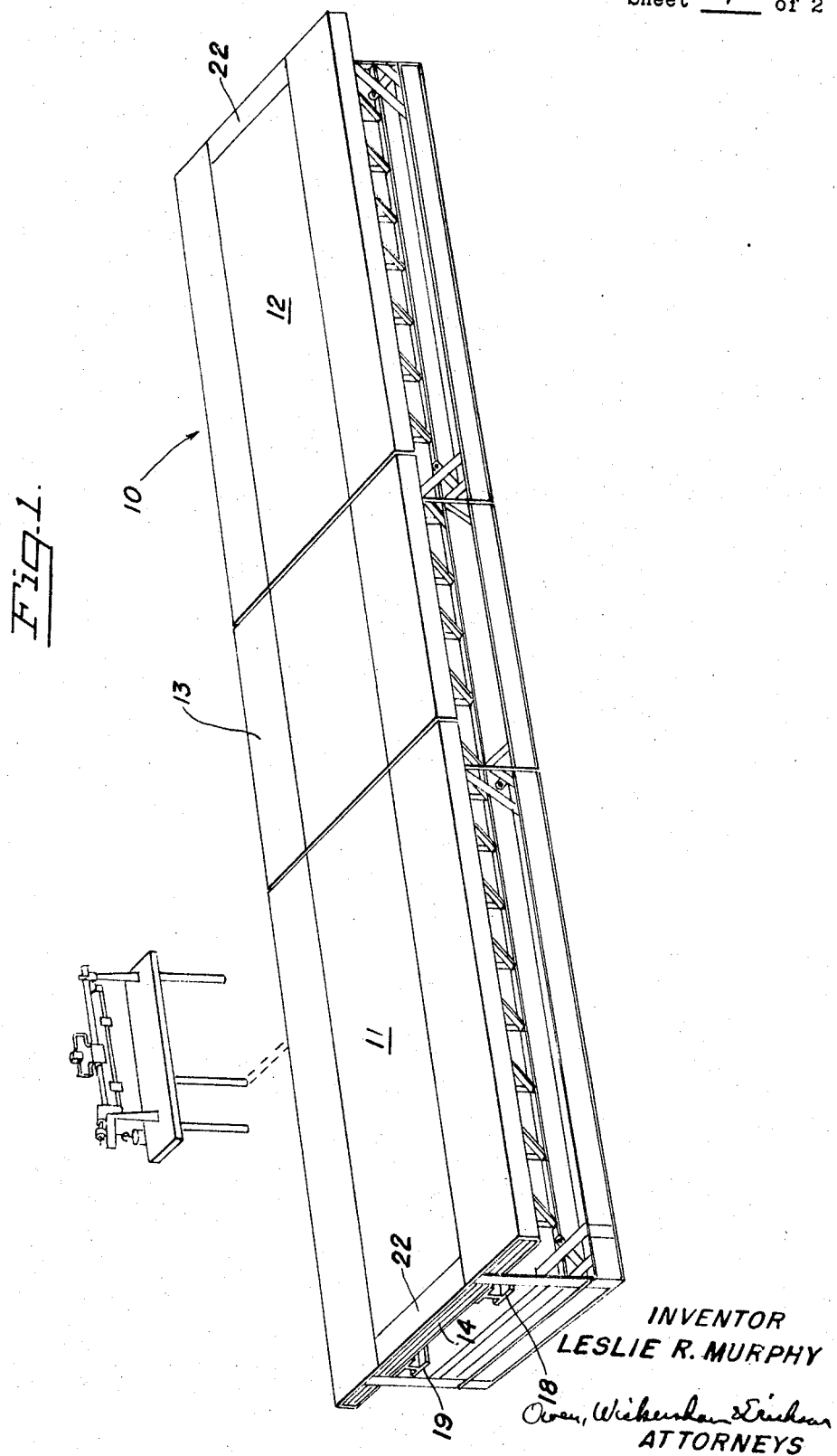

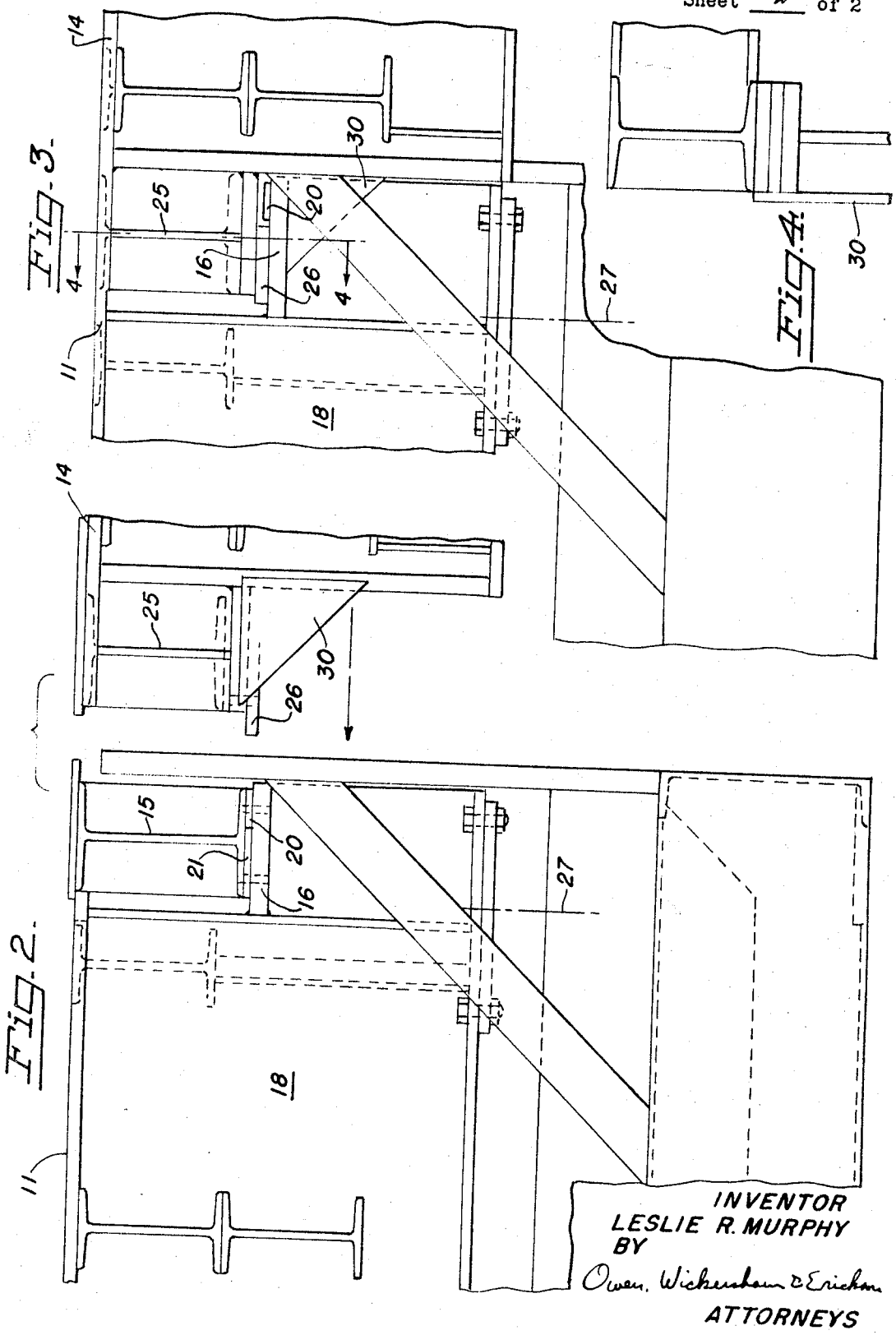

3,447,618
TRANSPORTABLE TANDEM-TYPE SCALE
Leslie R. Murphy, Sacramento, Calif., assignor to L. R. Murphy Scale Company, Sacramento, Calif., a corporation of California
Filed July 26, 1967, Ser. No. 656,086
Int. Cl. G01g 21/28
U.S. Cl. 177—126                                   6 Claims

ABSTRACT OF THE DISCLOSURE

This transportable tandem-type scale comprises at least three longitudinally succeeding sections in tandem. Each section has a base frame and a weighbridge having a rigid frame. In at least two of these sections the weighbridge is supported on the base frame by a lever system, each of these sections being able to serve as a complete scale and having on at least one end a removable end beam which is removed for transport thereof on a highway and is installable at certain times in the scale section, this end beam being supported when installed by a pair of pads by being bolted thereto. In a third, intermediate section the weighbridge has at each end a projection including a cross beam of substantially the same size and length as the removable end beam and adapted to rest, when the three sections are put together, on the pads without being bolted thereto, the cross beam resting predominantly on the pads on the opposite side of their center from their end and having means spacing the cross beams from the pad on the side of their center adjacent their end. The two sections on either side of the intermediate sections have their lever system joined in tandem, while the intermediate section has no lever system and its weighbridge transmits its load to the tandem lever system of the other two sections.

---

This invention relates to an improved portable scale of the type used for weighing very heavy and very lengthy off-the-highway vehicles.

The size of the very large vehicles used in highway construction and other off-the-highway work makes it difficult when the time comes to weigh them. Permanent scales are quite expensive to install and take a good deal of time to install accurately; so very large portable scales have come into use. These have to be transported on the highway, and this has given rise to a number of difficulties relating to their length and width. The present invention is concerned particularly with the problem of length.

In U.S. Patent No. 2,950,909, I provide a tandem scale in which several scale sections are joined together. The present invention uses the principles of that patent to extend the scale length so that very long vehicles are accommodated. In addition, it applies a new principle to enable the incorporation of a special intermediate weighbridge, located in between the tandem-connected weighbridges of two regular scale units which are altered only slightly. In fact, for very long scales I may utilize a plurality of intermediate weighbridges. In such a scale there may be five scale lengths comprising three regular scale units alternating with two intermediate weighbridges. In another, somewhat shorter scale there are two regular scale units connected by one intermediate weighbridge. The special problems and the solution to these problems will be more clearly understood from the detailed description that follows.

Other objects and advantages of the invention will appear from the following description of a preferred embodiment.

In the drawings:

FIG. 1 is a simplified view in perspective of a three-section scale embodying the principles of the invention, wherein a novel intermediate weighbridge is used to connect two similar single scale units.

FIG. 2 is an enlarged fragmentary view in side elevation and in section of the end portion of one standard scale unit, before removal of one of its end beams and of the adjacent end portion of the intermediate weighbridge before joining them together.

FIG. 3 is a similar view with the intermediate weighbridge joined to the scale unit.

FIG. 4 is a view in section taken along the lines 4—4 in FIG. 3.

A three-section scale 10 is shown in FIG. 1 wherein sections 11 and 12 are standard scale units of types shown in several other patents with their lever systems joined in tandem substantially as shown in U.S. Patent No. 2,950,909. In between them is supported an intermediate weighbridge 13, which has no lever system of its own but simply supplies an intermediate portion that relies on the weighbridges of the scale units 11 and 12 for transmitting the weight to the scale mechanism. This intermediate weighbridge 13 is designed to be removable from the sections 11 and 12, and the sections 11 and 12 are designed to have a removable part which is taken out when the sections are to be used consecutively in the manner shown in FIG. 1, and which are put in when the scale unit 11 or 12 is intended to be used as a single scale. Therefore, the weighbridges can be of a standard type and can readily be adapted to either single weighbridge scales or plural successive weighbridge scales.

Each section 11 and 12 may have a removable beam 15 which, when installed, extends the full width of the scale. If there are outriggers on the scale, as there often are in this type of extremely long and wide scale, the beam will extend the full width to which the scale reaches with its outriggers extended. The beam 15 rests on two pads 16 and 17 on the longitudinal beams 18 and 19 of the weighbridges of scale units 11 and 12 in FIG. 1. The pads 16 and 17 as shown in FIG. 2, each have a padlet 20 on top of their outer edge, while the beam 15 has a padlet 21 beneath its inner edge that complements the padlet 20. A short central platform section 22 may also be welded to the beam 15. Normally, the beam 15 is in place except during transport of the scale or in its use in this invention.

When the intermediate weighbridge 13 is to be used, the beam 15 is omitted from the connecting weighbridge 11 and 12, but the pads 16 and 17 are still used. The intermediate weighbridge 13 has a cross-beam 25 with a pad 26 beneath that is thicker than the padlets 20 and 21. For example, the padlets 20 and 21 may be one-half inch thick, while the pad 26 may be ¾ inch thick. As a result, upon assembly as in FIG. 3, there is contact between the pad 26 and the pads 16 and 17, but there is no vertical contact between the beam 25 and the padlet 20. Hence, the weighbridge 13 can be substantially depressed without making contact with the padlet 20. As a result, its load is all transmitted by the pad 26 to the pad 16 and thence to the longitudinal beam 18, the center of the load being closely adjacent to the center line 27 through which the load is transmitted to the scale levers. Any load that might be applied outside the center line 27 would tend to lift the other end of the weighbridge 11 or 12, and this becomes serious when the loads are heavy. Hence, the load bearing point of the intermediate weighbridge 13 is kept close to the center line 27, so that the tendency of the weighbridge to tip is substantially reduced.

Any longitudinal forces tending to separate the intermediate weighbridge 13 from the scale weighbridge 11 are opposed by the bearing of the pad 26 against the padlet 20, and forces in the opposite direction are similarly opposed by the bearing of the pad 26 on a portion of the longitudinal beam 18 of the scale weighbridge 11, effectively providing for simple and positive interlocking between the intermediate weighbridge and the scale weighbridge.

Two gussets, 30 and 31, one near each end of the beam 25, engage opposite sides of the beams 18 and 19 and provide alignment, so that it is not necessary to bolt the intermediate weighbridge 13 in place. These gussets 30 and 31 also increase the strength somewhat and provide the rigidity opposing lateral movement which is important. Being on the outer sides of the parallel beams 18 and 19 they prevent any relative movement there.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A transportable tandem scale comprising
   at least three longitudinally succeeding sections, each section having a base frame and a weighbridge with longitudinal side members with upper flanges,
   at least two of said sections having their weighbridges supported on their said base frame by a lever system, their lever systems being joined in tandem, each of those said two sections having at one end, a pair of pads, one on each said longitudinal side members, and by
   an intermediate section in between said two sections, having its said weighbridge provided at each end with a cross beam resting, when said three sections are put together, on said pads.

2. The scale of claim 1 wherein each said cross beam has a pair of bottom pads thereon, resting on said pads of said two sections only on the portions thereof most distant from their outer ends.

3. The scale of claim 2 having a pair of aligning vertical flanges on each end of the weighbridge of said intermediate section and extending lengthwise thereof engaging the farthest-apart sides of said longitudinal side members, to aid in aligning adjoining said sections and to obviate the necessity for bolts and other positive attachment between said intermediate sections and said two sections.

4. A transportable scale comprising
   at least three longitudinal succeeding sections,
   at least two of said sections being separate units each able to be used as a scale by itself and each having a base frame, and a weighbridge having a rigid frame, including longitudinal side members with upper flanges,
   the weighbridge being supported on said base frame by a lever system, the lever systems being joined in tandem, and having at least at one end a removable end beam which is removable for transport thereof on a highway and is installable at certain times in said scale section, said end beam being supported when installed by a pair of pads on said upper flanges,
   said scale also having one intermediate section having a weighbridge with a projection at each end including a cross beam of substantially the same size and length as said removable end beam and adapted to rest, when said three sections are put together, on said pads without being bolted thereto.

5. The scale of claim 4 wherein said pads are provided with a first padlet immediately adjacent their ends for support of said removable end beam and whereas each said cross beam has second padlets thicker than said first padlets and resting, when installed on said pads away from and inboard of said first padlets, said second padlets holding said cross beam away from contact with said first padlets and thereby transmitting weight from said intermediate weighbridge inboard of said first padlets.

6. The scale of claim 5 wherein below said cross beam padlets said weighbridge has a pair of gusset-like members spaced apart the distance between the outer sides of said upper flanges, for aligning said intermediate section with respect to said two scale-unit sections.

References Cited

UNITED STATES PATENTS

| | | | |
|---|---|---|---|
| 741,212 | 10/1903 | Barclay | 177—134 |
| 2,950,909 | 8/1960 | Murphy | 177—259 XR |

ROBERT S. WARD, JR., *Primary Examiner.*

U.S. Cl. X.R.

177—133, 136, 256